(12) United States Patent
Weng et al.

(10) Patent No.: US 8,817,087 B2
(45) Date of Patent: Aug. 26, 2014

(54) ROBUST VIDEO-BASED HANDWRITING AND GESTURE RECOGNITION FOR IN-CAR APPLICATIONS

(75) Inventors: Fuliang Weng, Mountain View, CA (US); You-Chi Cheng, Palo Alto, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 444 days.

(21) Appl. No.: 12/916,862

(22) Filed: Nov. 1, 2010

(65) Prior Publication Data

US 2012/0105613 A1 May 3, 2012

(51) Int. Cl.
*H04N 9/47* (2006.01)
*G06K 9/00* (2006.01)
*G06F 3/042* (2006.01)
*H04N 5/232* (2006.01)

(52) U.S. Cl.
CPC .............. *G06K 9/00* (2013.01); *G06K 9/00355* (2013.01); *G06F 3/0425* (2013.01); *G06T 2207/30241* (2013.01); *G06T 2207/30196* (2013.01); *H04N 5/23264* (2013.01)
USPC ............. 348/77; 382/103; 382/199; 382/224; 382/170; 382/165; 348/208.99; 348/E5.046; 345/683

(58) Field of Classification Search
None
See application file for complete search history.

(56) References Cited

U.S. PATENT DOCUMENTS

| 7,050,606 | B2 | 5/2006 | Paul et al. |
| 7,295,904 | B2 | 11/2007 | Kanevsky et al. |
| 7,916,126 | B2 * | 3/2011 | Westerman et al. .......... 345/173 |
| 2002/0118880 | A1 * | 8/2002 | Liu et al. ........................ 382/199 |
| 2002/0146173 | A1 * | 10/2002 | Herley .......................... 382/199 |
| 2004/0212686 | A1 * | 10/2004 | Usami ...................... 348/208.99 |
| 2005/0063564 | A1 | 3/2005 | Yamamoto et al. |
| 2006/0136846 | A1 | 6/2006 | Im et al. |
| 2007/0182595 | A1 * | 8/2007 | Ghasabian ........................ 341/22 |
| 2008/0309629 | A1 * | 12/2008 | Westerman et al. .......... 345/173 |
| 2009/0102788 | A1 | 4/2009 | Nishida et al. |
| 2009/0278915 | A1 | 11/2009 | Kramer |
| 2009/0287361 | A1 | 11/2009 | Iwashima et al. |
| 2010/0226539 | A1 * | 9/2010 | Ishii .............................. 382/104 |
| 2011/0052003 | A1 * | 3/2011 | Cobb et al. .................... 382/103 |
| 2011/0141066 | A1 * | 6/2011 | Shimotani et al. ............. 345/177 |

FOREIGN PATENT DOCUMENTS

| GB | 2355055 A | 11/2001 | |
| JP | WO2010064389 A1 * | 6/2010 | .............. B60R 16/02 |
| WO | WO 2010064389 A1 * | 6/2010 | .............. G06F 3/048 |

OTHER PUBLICATIONS

"SmartCanvas__A Gesture-Driven Intelligent Drawing Desk System", Zhenyao Mo, J. P. Lewis , Ulrich Neumann; Proceedings of the 10th international conference on Intelligent user interfaces, pp. 239-243 , ACM New York, NY, USA © 2005.*
"Qualitative evaluation of the cue integration and the tracking trajectories", Antonis, Oct. 5, 2003.*

(Continued)

*Primary Examiner* — Sath V Perungavoor
*Assistant Examiner* — Dakshesh Parikh
(74) *Attorney, Agent, or Firm* — Maginot, Moore & Beck

(57) ABSTRACT

A method of receiving input from a user includes sensing a first trajectory of a center of mass of a hand of the user during a gesture made by the hand. A second trajectory of a finger tip of the hand of the user during the gesture made by the hand is also sensed. An alphanumeric character represented by the gesture made by the hand is determined dependent upon both the first trajectory and the second trajectory.

6 Claims, 10 Drawing Sheets

(56) References Cited

OTHER PUBLICATIONS

C. Stauffer, W.E.L. Grimson; "Adaptive Background Mixture Models for Real-Time Tracking"; Proc. of CVPR 1999, pp. 246-252 (7 pages).

A. Eglammal; D. Harwood; L.S. Davis; "Non-Parametric Model for Background Subtraction"; Proc. of ICCV 1999 Frame-Rate Workshop, 1999. (17pages).

B. Han; D. Comaniciu; L. Davis; "Sequential Kernel Density Approximation Through Mode Propagation: Applications to Background Modeling"; Proc. ACCV—Asian Conf. on Computer Vision, 2004. (6pages).

A. Wu; M. Shah; N. Da Vitoria Lobo; "A Virtual 3D Blackboard: 3D Finger Tracking Using a Single Camera"; In Proc. IEEE Intl. Conf. on Auto. Face and Gesture Recog., pp. 536-543, Mar. 2000. (8 pages).

Z.-L. Bai and Q. Huo; "A Study on the Use of 8-Directional Features for Online Handwritten Chinese Character Recognition"; in Proc. IEEE ICDAR 2005, vol. 1, pp. 262-266, Aug. 2005. (5 pages).

M. Nakai; N. Akira; H. Shimodaira; S. Sagayama; "Substroke Approach to HMM-Based On-Line Kanji Handwriting Recognition"; In Proc. Sixth Int'l Conf. Document Analysis and Recognition, pp. 491-495; 2001. (6 pages).

David G. Lowe; "Distinctive Image Features From Scale-Invariant Keypoints"; International Journal of Computer Vision, 60, 2 (2004), pp. 91-110. (28 pages).

M. Piccardi; "Background Subtraction Techniques: A Review"; in Proc. IEEE Int'l Conf. Systems, Man and Cybernetics, vol. 4, pp. 3099-3104, 2004. ( 5 pages).

\* cited by examiner

ROBUST VIDEO-BASED HANDWRITING AND GESTURE RECOGNITION FOR IN-CAR APPLICATIONS

BACKGROUND OF THE INVENTION

1. Field of the Invention

The present invention relates to handwriting and gesture recognition techniques, and, more particularly, to handwriting and gesture recognition techniques for in-vehicle applications.

2. Description of the Related Art

Information entry in a motor vehicle by the vehicle operator, such as address entry to navigation devices, has always been a challenging and often dangerous task. Traditionally, vehicle operators issue commands or enter information by operating various controls in the car, such as physical buttons for radios, or displayed buttons on the touch screen of a navigation system. Such operations typically require that the operator divert his eyes from the road in order to locate the desired buttons, and sometimes the operator overstretches his arms in trying to reach the desired buttons. This is especially distracting, time-consuming, and dangerous when the buttons are small, such as on a touch screen, and the task is complicated, such as when entering an address into a navigation device. Moreover, a touch screen has to be installed within close proximity to (i.e., within the reach of) the driver, thus limiting the design options for in-vehicle dashboard layout.

Instead of using touch screens, several auto manufacturers use a combination of remote control and graphical display (for example, BMW iDrive system, and Lexus Remote Touch Interface system), so that the graphical display could be placed farther away from the operator. Still, these systems require that the operator operates the remote controls, and looks at the visual feedback on the graphical display for information and command entry. Address entry on the iDrive system, for example, requires that the operator operates the remote control to select from a list of letters, states, and/or city names from the graphical display. This is still a lengthy and dangerous process as the operator needs to move his eyes off the road for a significant period of time.

Gesture recognition and handwriting recognition has advantages over other input methods, such as a keyboard, mouse, speech recognition or a touch screen. A keyboard is a very open-ended input device and requires that the user have some basic typing proficiency. A keyboard and a mouse both contain moving parts. Thus prolonged use leads to decreased performance as the device wears out. The keyboard, mouse, and touch screen all require direct physical contact between the user and the input device, which may result in degradation of the system performance as these contact interfaces are exposed to the environment. They also require hand/finger and eye coordination, which is rather prohibitive during driving. Furthermore, any tactile interface which is exposed to the public may be abused or damaged by vandalism.

Tactile interfaces may also have hygiene problems as a result of the system becoming unsanitary or unattractive to users, and performance of the interfaces may decline. These effects may greatly diminish the usefulness of systems that accommodate a large number of users, such as advertising kiosks open to the general public. This cleanliness issue may be particularly important for the touch screen, where the input device and the display screen are part of the same device. Thus, as the input device becomes dirty, the effectiveness of the input and display is reduced. The performance of speech recognition may be very poor in potentially noisy environments, such as passenger compartments of vehicles, whether the windows are rolled down or not. Also, speech recognition may not be appropriate where silence is needed, such as in a military mission or in a library.

Gesture and handwriting recognition systems avoid the problems listed above. There are no moving parts in gesture recognition systems, so devices do not wear out. Cameras including infrared ones that are used to detect features for gesture recognition can be easily built to withstand harsh environments, and can be made very small so that they can be used in a wider variety of locations. In a gesture recognition system there is no physical contact between the user and the device, and so there is no hygiene problem. The gesture recognition system does not require any sound to be made or detected, so background noise does not cause a problem. A gesture recognition system is capable of controlling a number of devices in response to interpreting a set of intuitive gestures and handwritings. The gestures recognized by the system may be selected as being those that seem natural to users, which decreases the required learning time period. The gesture recognition system can also provide users with symbol pictures of useful gestures that are similar to those normally used in American Sign Language books. Simple tests can then be used to decide what gestures are most intuitive for any given application.

For certain types of devices, the use of gesture inputs is more practical and intuitive. For example, when controlling a compact disc player within a vehicle, basic commands such as "next track", "previous track", "increase volume", "decrease volume", etc., may be most efficiently communicated in the form of gestures. Certain other environments also derive practical benefits from using gestures. For example, keyboards may be awkward to carry on some military missions, and may create noise on missions where silence is essential to success. In such scenarios, gestures may be the most effective and safest form of input.

Most gesture recognition systems are developed for indoor environments. Some impressive applications include: controlling an avatar in a virtual environment application or being one of the modalities in home device control systems. In addition, some gesture recognition systems may have similar algorithms, but may require some special or intrusive devices. However, such special or intrusive devices may be particularly undesirable in a typical in-car environment wherein space is at a premium, and any visual clutter needs to be avoided.

The first step in a hand gesture recognition method is a hand detection module. The function of this module is to detect and locate the hand region in every frame of the video sequence. In order to detect the hand region, several different techniques can be applied. Such techniques can be classified into two main categories: motion-based and background subtraction-based. The motion-based technique assumes that the background moves slower than the hand region. This motion-based technique is quite efficient when the background is almost steady, but may need more computing resources when the background undergoes a greater rate of change. In order to cope with changing background scenarios, typical techniques such as running average, Gaussian mixture model, kernel density estimation, mean shift algorithm, etc., can be used for both hand detection techniques.

The background subtraction-based method is intuitive, and several background/foreground modeling techniques can also be applied to strengthen the reliability of the hand detection module. The basic technique for the background subtraction-based method is to examine the difference between the current frame and the background frame on a pixel-by-pixel basis. If the difference between a pixel's value and a pixel value in the background frame is larger than a predefined threshold in any predefined color space such as grayscale, HSV, normalized RGB, YCbCr, etc, then the corresponding pixel is determined to be a possible candidate for the hand region. Instead of using the threshold, the background subtracted frames can also be passed through any skin color model such as Gaussian mixture model or histogram based techniques in order to locate the hand region.

The known background subtraction techniques typically deal with either a static background or fast moving background. However, the background in in-vehicle settings typically falls in-between these two extreme cases. For example, the background of the video stream in an in-car environment usually moves slowly because of small vibrations within the car. Furthermore, the illumination level does not usually change drastically in a typical in-car environment.

What is neither disclosed nor suggested in the art is a driver input system that overcomes the problems and limitations described above. More particularly, what is neither disclosed nor suggested is a driver input system that provides improved performance in reading a user's spatial hand gestures. Such spatial hand gestures may include the "drawing" of alphanumeric characters with a user's finger on or near a surface within the vehicle.

SUMMARY OF THE INVENTION

The present invention may provide an improved handwriting and gesture recognition system for text entry in a motor vehicle. The system may include a hand region detection module, a feature extraction module, and a handwriting and gesture recognition module. This system may also include a gesture-capturing device to acquire the video stream for a hand gesture sequence. Using the system, the sequence of hand gesture performed by a motor vehicle operator can be recognized and understood. Then the corresponding commands may be sent to in-car devices such as radios or heaters, or content such as destination addresses may be sent to navigation devices. This hand gesture recognition system may be integrated with a speech recognition system, or with systems of other input modalities. Thus, information and commands may be better recognized by taking advantage of inputs from multiple modalities.

A simple, safe, and easy-to-use in-car information and command entry system is a valuable feature in any in-vehicle HMI (Human Machine Interface) system. The inventive system enables this desired feature by use of properly mounted cameras, a hand region detection module, a feature extraction module, and a handwriting and gesture recognition module.

The invention comprises, in one form thereof, a method of receiving input from a user, including sensing a first trajectory of a center of mass of a hand of the user during a gesture made by the hand. A second trajectory of a finger tip of the hand of the user during the gesture made by the hand is also sensed. An alphanumeric character represented by the gesture made by the hand is determined dependent upon both the first trajectory and the second trajectory.

The invention comprises, in another form thereof, a method of entering input into a vehicle system, including capturing a plurality of images of a hand of a user during a gesture made by the hand. At least two separate and unconnected shapes are identified in each of the images. The shapes have first image characteristics that are distinguishable from second image characteristics associated with a background behind the hand in the images. The captured images are modified by merging the separate and unconnected shapes in each of the images into a single continuous shape. A trajectory of at least one portion of the hand is determined based on the modified images.

The invention comprises, in yet another form thereof, a method of entering input into a vehicle system, including capturing a plurality of images including a hand of a user during a gesture made by the hand. An image characteristic associated with a background behind the hand in the images is ascertained. A location of a boundary of the hand in the images is identified dependent upon the determined image characteristic of the background. A trajectory of at least one portion of the hand is determined based on the identified boundary of the hand in the images.

An advantage of the present invention is that it may be specifically designed for an in-car environment and may address the problems of such an application.

Another advantage is that the system may integrate the knowledge from both the fingertip and hand location (COM) to improve the robustness of gesture recognition for typical in-car environments and applications.

Yet another advantage is that, although there are some known previous efforts directed to written text trajectory based detection, the feature combination of the present invention may lead to a set of more reliable features for a background-changing environment without creating a high level of demand for computer power. Thus, the invention is more practical in such background-changing environments.

BRIEF DESCRIPTION OF THE DRAWINGS

The above mentioned and other modules, processes, and objects of this invention, and the manner of attaining them, will become more apparent and the invention itself will be better understood by reference to the following description of embodiments of the invention taken in conjunction with the accompanying drawings, wherein.

Figure 1:
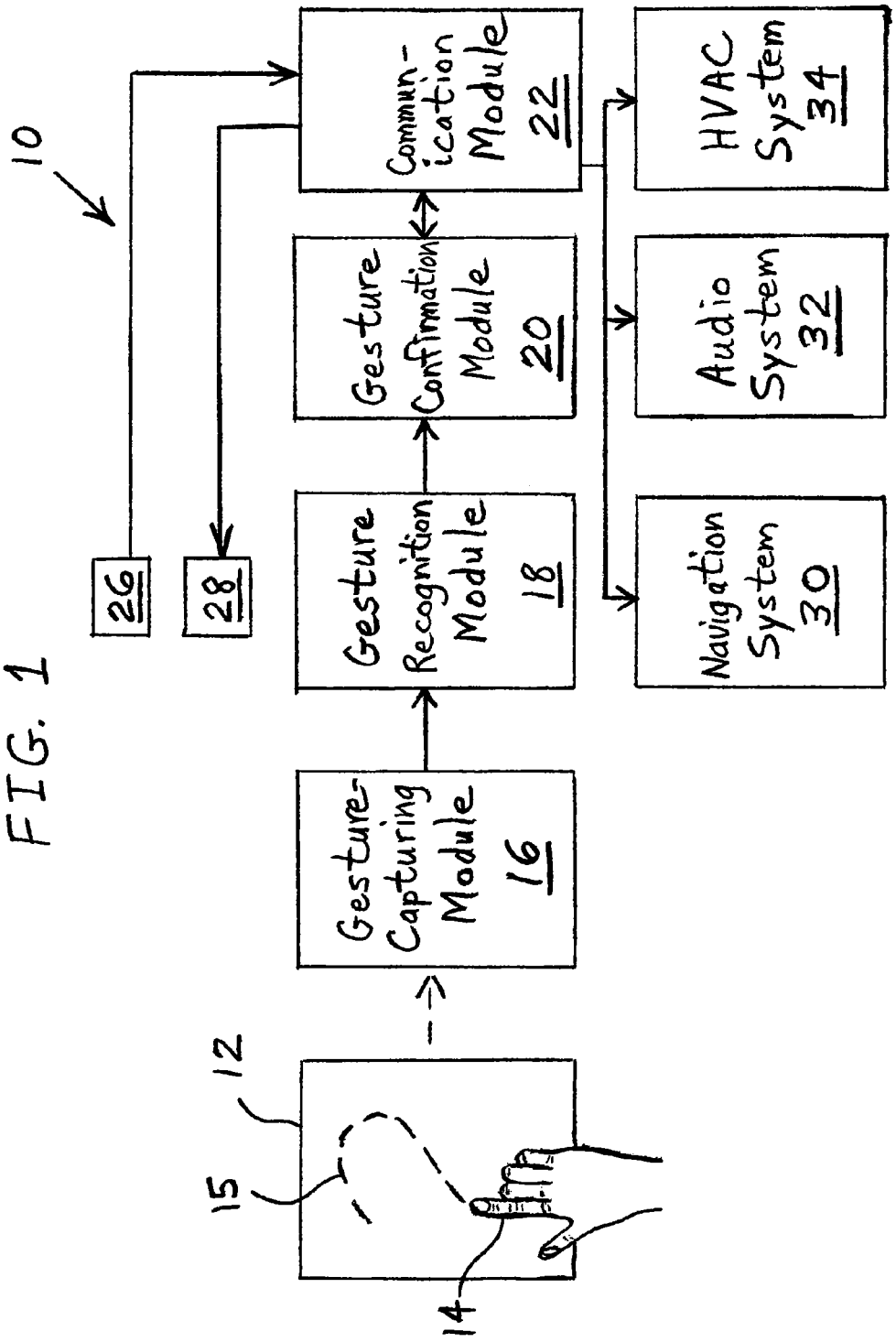
FIG. 1 is a block diagram of one embodiment of a gesture-based information and command entry system of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

The present invention may provide a method and system that enables a motor vehicle operator to enter information and commands without diverting his eyes from the road or over-stretching his arms. Using the system, the operator may "write", via hand gestures, on or near a surface anywhere within a pre-designated area close to the operator in the motor vehicle, such as the surface of the steering wheel or arm rest. Any surface within the operator's proximity may be used to write upon. Gestures may be in the form of the operator moving or sliding his finger across the surface to make writing movements. Thus, the invention may avoid the need for the operator to locate and operate pushbuttons. The information and commands denoted by the hand gestures may be captured by a gesture capturing module, recognized by a recognition module, confirmed via a confirmation module, and then transmitted to corresponding devices within the vehicle.

The invention may provide a system that serves as a backbone for an in-car hand gesture recognition system. In order to operate this system, one or more video acquisition devices such as camera(s) may be used to capture hand gestures performed by the vehicle operator on a background surface. The background surface may be the surface of the steering wheel or another designated surface that will not distract the operator. The inventive system may process the acquired video stream in real-time, and can be used to send the desired in-car commands that are indicated by the hand gestures to several devices. By using the framework of this inventive system, the driver can give commands to the in-car devices in a very natural and effortless way while driving. Furthermore, the level of safety in performing the in-car device operation is greatly enhanced.

In one embodiment of the system, one or more cameras are mounted inside a motor vehicle to capture the image of the steering wheel, as well as the operator's hand gestures when he "writes" on the steering wheel. In a particular embodiment, the operator writes down the destination address for the navigation device on the steering wheel using his index finger, just as he would on a piece of paper. The hand gestures, i.e., the movements of the user's hand and fingers, may be captured by the mounted camera(s). A recognition module may recognize the address denoted by the hand gestures. The recognized address may then be transmitted to the navigation device.

The system of the invention may read hand gesture "writing" on a surface, or anywhere within a pre-designated area that is close to the operator inside the motor vehicle environment, such as the surface of the steering wheel or arm rest. The hand gesture writing may be detected in the video sequence and captured. Then the system may recognize the captured gestures and writings. In-car video acquisition devices may be mounted on any proper location inside the car so that the video sequence with hand gestures can be captured. Once the hand gesture video sequence is captured by these devices, the online, real-time algorithm of the invention can be applied to interpret the gestures and use the gesture interpretations as inputs for the in-car command system.

Other embodiments of the invention may integrate the gesture input modality with other user input modalities such as speech input in a dialog system. In one embodiment, the user may speak the destination address while writing all or part of the address on the steering wheel using hand gestures. Both speech input and hand gesture input may be integrated to help the recognition module recognize the intended address.

The in-vehicle information and command entry system of the invention may use a surface anywhere within the operator's proximity, and may be integrated with a dialog system that implements acoustic confirmation. The invention takes advantage of a natural input approach in that the operator writes down information instead of using a set of predefined gesture patterns.

The invention may be applicable to any in-vehicle human-machine interface (HMI) system. For example, the operator input system of the invention may be used to enter inputs into a navigation system, an entertainment system, or an HVAC climate control system.

Referring now to the drawings, and particularly to FIG. 1, there is shown one embodiment of a gesture-based information and command entry system 10 of the present invention, including a surface 12 on which a user may "air-write" by sliding or moving his index finger 14 across surface 12. Finger 14 may maintain contact with surface 12 throughout the writing process, may contact surface 12 intermittently throughout the writing process, or may not contact surface 12 at all throughout the writing process.

The user may write alphanumeric characters on surface 12. In the example of FIG. 1, the user is writing the number "2" on surface 12. For illustrative purposes, the beginning of the number "2" is depicted in a dashed line 15 on or above surface 12. However, in actuality, there may be no visible indication of where finger 14 has previously been on or above surface 12.

The movements of finger 14 along surface 12 may be sensed and recorded by gesture-capturing module 16. In one embodiment, gesture-capturing module 16 may be in the form of one or more cameras. For example, module 16 may detect and record in digital form the movement of finger 14 along a path, such as the path depicted by line 15.

The finger movements sensed by module 16 may be digitized, and these digitized movements are transmitted as an input to a gesture recognition module 18. Gesture recognition module 18 may determine which of the twenty-six letters or ten numerals is best represented by the movement made by the user's finger or hand. Module 18 may recognize lower- or upper-case letters, and also may recognize printed letters, block letters, or script letters.

The recognition function performed by module 18 may depend upon the shape of surface 12. For example, if surface 12 is convex, as may be typical for the central portion of a steering wheel, then module 18 may take the convexity into account when determining which alphanumeric character has been drawn. Further, module 18 may take into account the exact shape of surface 12, including the position of each point of surface 12 along a direction generally perpendicular to surface 12.

Gesture recognition module 18 may recognize a single character, or may recognize groups of letters and/or numbers in the form of words. Module 18 may discern a recognizable word when enough characters have been drawn to do so, or after the user has indicated that the last character of a word has been drawn. The user may indicate that the last character of a word has been drawn by, for example, drawing a period (i.e., dot) on surface 12 or by interrupting his drawing activity on surface 12 for a predetermined period of time.

The output of gesture recognition module 18 may be in the form of a word, letter or number that corresponds to a possible selection, command, input, or piece of information provided by the user. For example, the output of gesture recognition module 18 may be in the form of the letter "B", or the numeral "3" corresponding to particular respective menu selections. The output of gesture recognition module 18 may also be in the form of a command such as "find" for a navigation system, "play" for an entertainment system, or "defrost" for an HVAC system, for example. Associated with such commands may be input data that the user also writes on surface 12, before or after the command. For example, associated with the command "find" may be the address "10 Elm Street". As another example, associated with the command "play" may be "Beethoven's Fifth Symphony", or a radio station identification such as "WGN" or "720 AM". As yet another example, associated with a "heat" command for an HVAC system may be a temperature level such as "75 F" and/or a location such as "driver".

Figure 2:
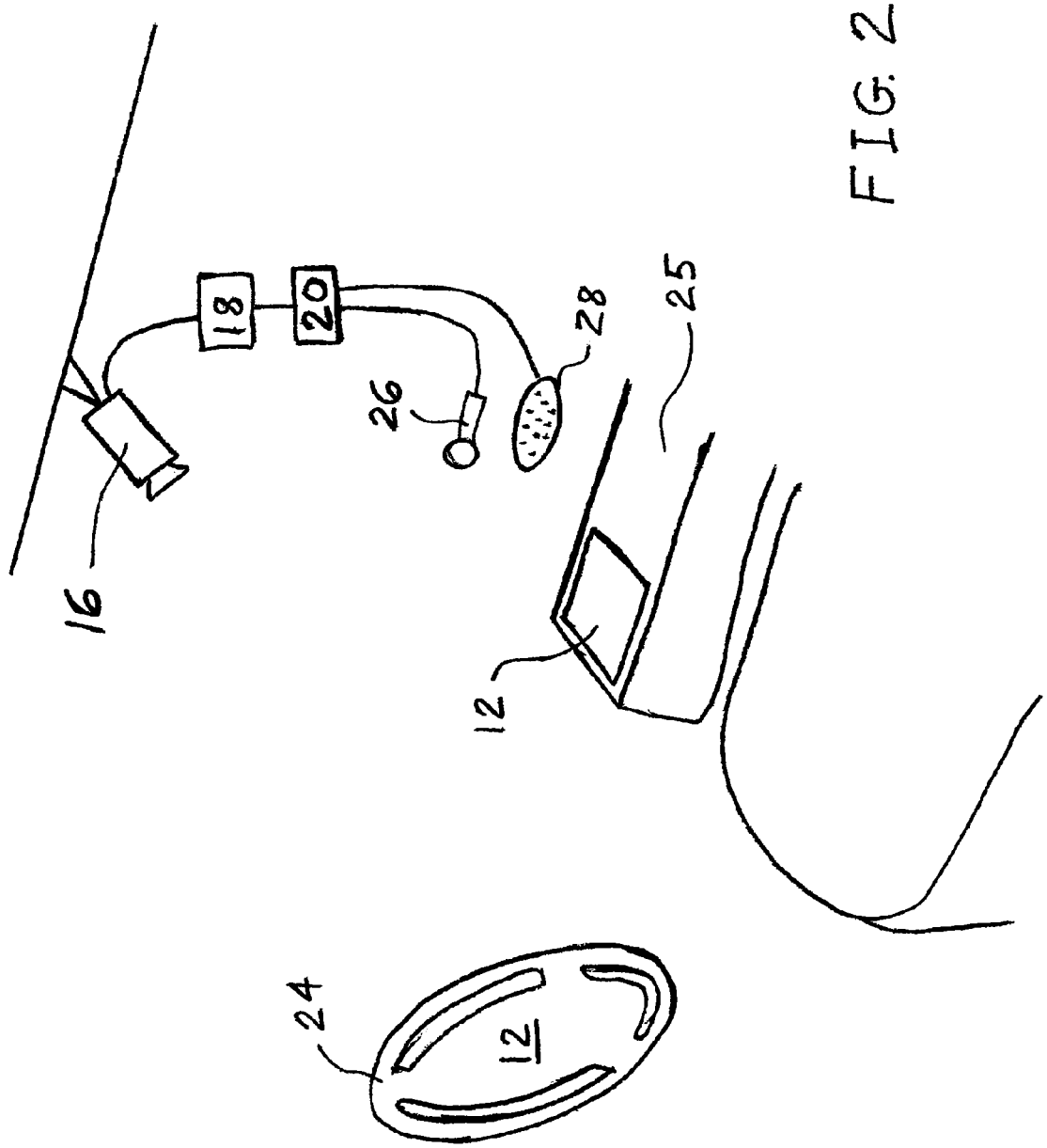
FIG. 2 is a perspective view of the gesture-based information and command entry system of FIG. 1.

The output of gesture recognition module 18 may be received by an optional gesture confirmation module 20. Gesture confirmation module 20 may seek and/or receive feedback from the user to confirm that the output of gesture recognition module 18 is correct. For example, confirmation module 20 may audibly seek confirmation from the user of his input. If the output of gesture recognition module 18 is "defrost", then confirmation module 20 may audibly (e.g., via audio speaker 28; FIG. 2) ask the driver "Did you write 'defrost?'". In order to confirm that he did indeed say "defrost", the user may speak "yes", which may be received by a microphone 26 and may be input into confirmation module 20. Alternatively, the user may confirm that he did indeed say "defrost" by writing "y" for "yes" on surface 12. If, on the other hand, the user did not write "defrost", then he may speak "no" or write "n" on surface 12. In response, confirmation module 20 may audibly ask the driver to "please re-write the previous entry". The cycle continues with gesturing capturing module 16 interpreting the user's gestures until confirmation module 20 receives confirmation that it recognized the gesture correctly (i.e., as the user intended). After receiving confirmation of correct recognition of the user's gesture, confirmation module 20 may then forward the recognized gesture to a vehicle system, such as navigation system 30, audio system 32 or HVAC system 34. In addition, or in the alternative, confirmation module 20 may use other modalities (visual, pushbutton, gesture, etc.) for seeking user confirmation as well.

It is to be understood that gesture confirmation module 20 is optional in the invention. That is, it is possible for the recognition output of module 18 to be forwarded to vehicle systems 30, 32 and/or 34, perhaps by communication module 22, without the recognition or interpretation being first confirmed by confirmation module 20.

A perspective view of gesture-based information and command entry system 10 as installed within the passenger compartment of an automobile is shown in FIG. 2. Two surfaces 12 for the driver to finger-write upon are shown, although only one of the two surfaces 12 may be included in practice. One of surfaces 12 is provided in the central portion of a steering wheel 24. Another one of surfaces 12 is provided on the top of the driver's right-hand side armrest 25.

A gesture-capturing module in the form of a camera 16 may be installed on the roof of the car's passenger compartment, generally above the driver's head. Camera 16 may be directed towards whichever of the two surfaces 12 is actually provided in the vehicle. However, it is also possible, in an embodiment which includes both of surfaces 12, for camera 16 to be adjustable such that it may be selectively directed at either or both of surfaces 12.

As shown in FIG. 2, confirmation module 20 may be connected to a microphone 26 and an audio speaker 28. Microphone 26 and audio speaker 28 may be installed anywhere within the passenger compartment, such as in the armrest, in the dashboard, or in the doors, for example.

Figure 3:
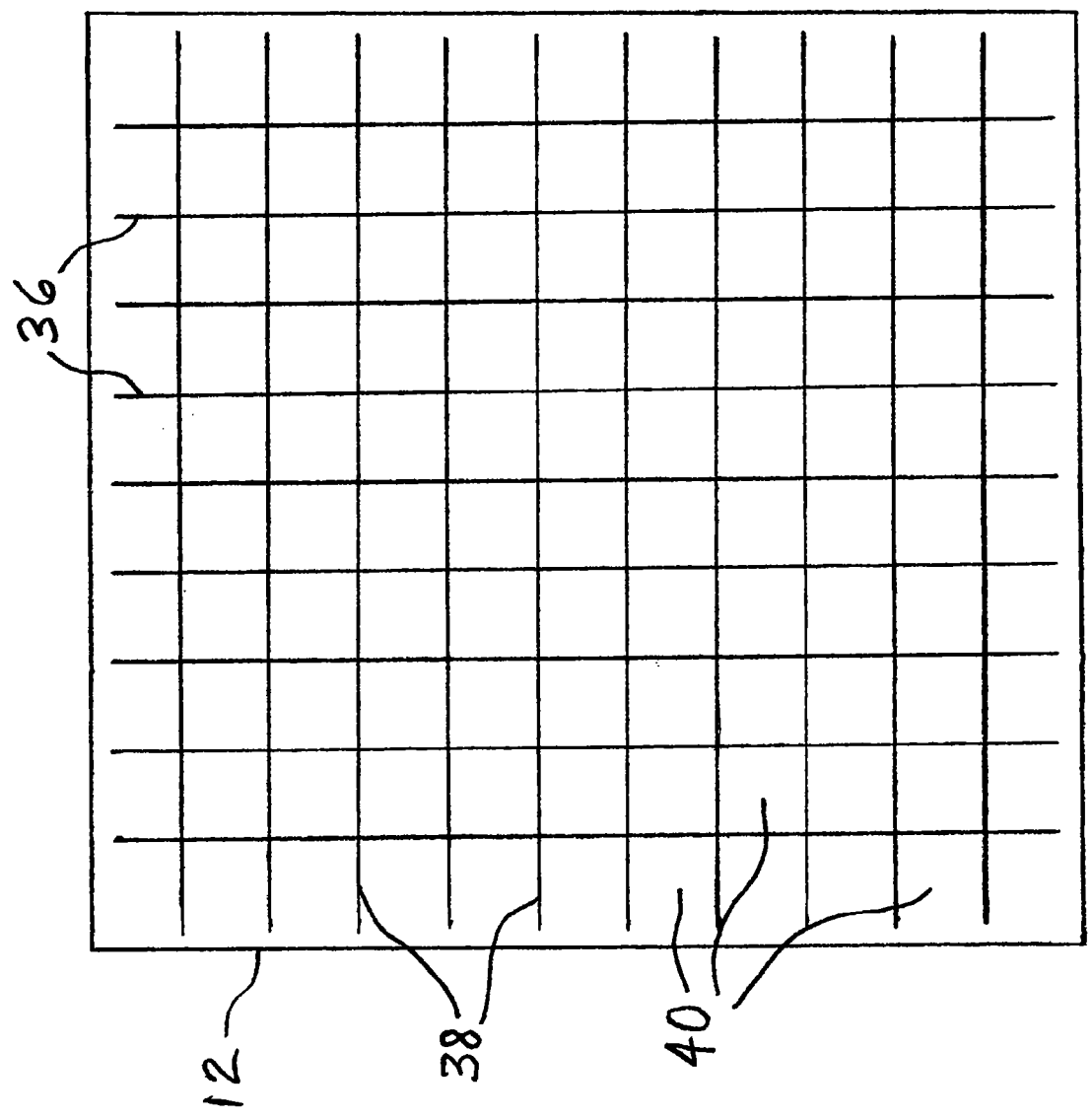
FIG. 3 is a plan view of one embodiment of the writing surface of FIGS. 1 and 2.

FIG. 3 illustrates a grid layout that may be included in one embodiment of a writing surface 12. The grid layout includes a rectangular matrix of rows and columns as defined by equally-spaced vertical lines 36 and equally-spaced horizontal lines 38.

Gesture recognition module 18 may determine which alphanumeric character the user has drawn based upon which cells 40 within the grid layout the user has slid his finger across, and in what sequential order he did so. Gesture recognition module 18 may use a lookup table or an algorithm to make a list of cells 40 that the user's finger has passed across, and translate that list of cells into a recognized alphanumeric character. The sequential order in which cells 40 were touched may also be an input into the lookup table or algorithm.

In order to improve the visual contrast between the user's hand and background surface 12, and thus improve the accuracy of the gesture-capturing process, surface 12 may be formed of a solid color such as white. Such a solid white color for surface 12 may also make it easier for camera 16 to detect the locations of lines 36, 38 by virtue of the greater contrast provided thereby.

However, one embodiment of the method of the invention may enable non-white surfaces 12 to be more easily used as the background for gesture recognition. To address the special needs in such non-white background use cases, the invention incorporates the knowledge about the in-car environment, such as color distribution of the steering wheel and the skin color model, into the traditional background/foreground model, thus enhancing the performance of the hand gesture recognition or segmentation.

Figure 4:
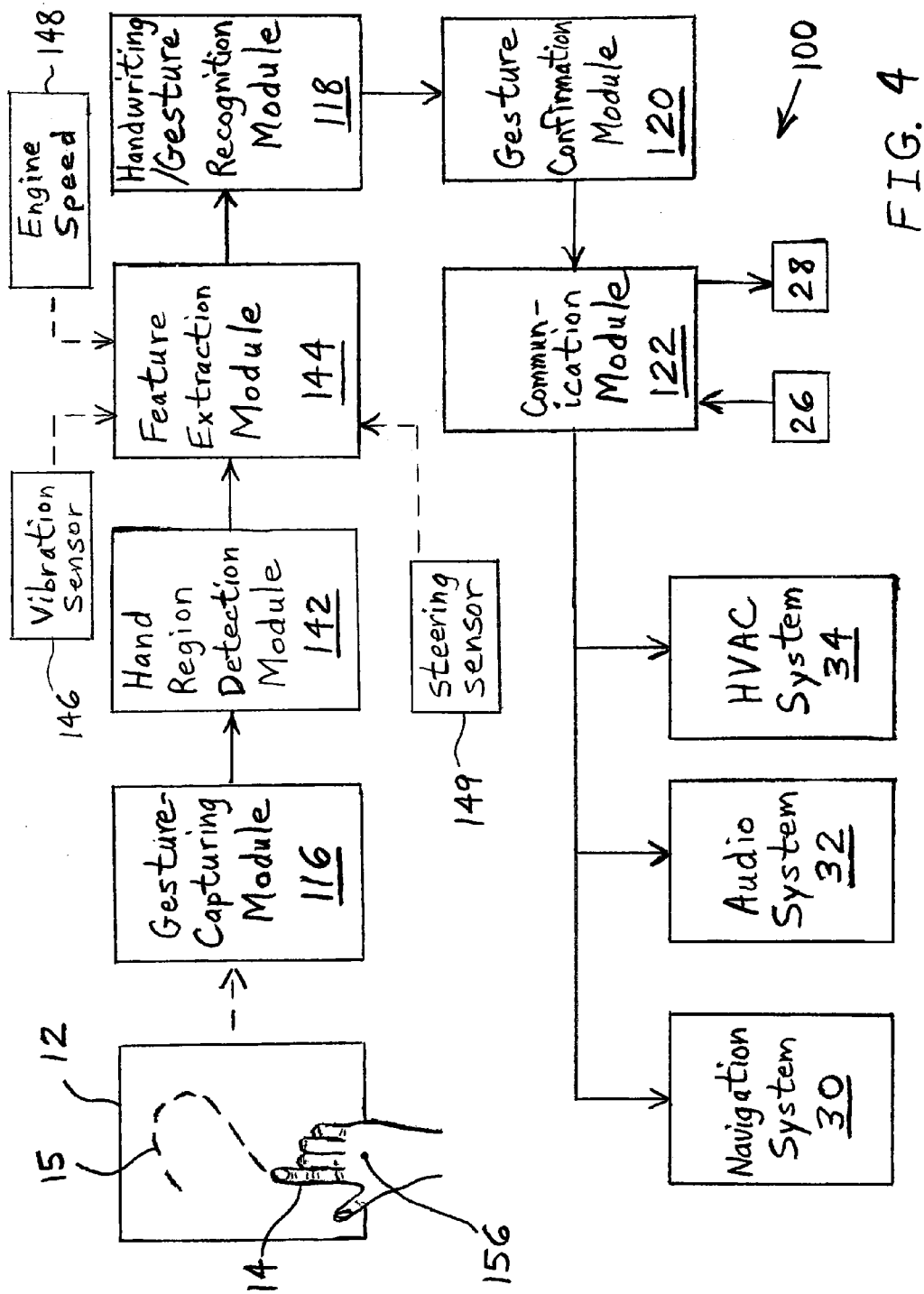
FIG. 4 is a block diagram of another embodiment of a gesture-based information and command entry system of the present invention.

In FIG. 4, there is shown another embodiment of a gesture-based information and command entry system 100 of the present invention, including a gesture-capturing module 116 which may be in the form of one or more cameras. The finger movements sensed by module 116 may be digitized, and these digitized movements are transmitted as an input to a hand region detection module 142. Hand region detection module 142 may analyze the images captured by module 116 and determine whether such images are consistent with the movement of a human hand, taking into consideration the color of the background surface 12. That is, knowing the color of the background surface (e.g., the color of the interior of that particular vehicle), module 142 may better distinguish the hand image from the background image. For example, if the background surface is known to be a color in sharp contrast with typical skin tones, such as white or green, then module 142 may require a relatively high degree of color contrast between the color value of a pixel, or a group of pixels, and the known background color in order for the pixel(s) to be deemed to be part of a hand image. Conversely, if the background surface is known to be a color that is close to typical skin tones, such as beige, tan or brown, then module 142 may require a relatively low degree of color contrast between the color value of a pixel, or a group of pixels, and the known background color in order for the pixel(s) to be deemed to be part of a hand image. In addition, or alternatively, module 142 may simply consider pixels having color values that do not match, or are not close to, the known background color to be more likely to be part of a hand image.

As described above, in a particular embodiment, it is decided that a pixel in an image is part of the hand if the color of the background is close to skin tone, and a difference between a color of the pixel and the color exceeds a relatively low threshold difference. However, if the color of the background is not close to skin tone, it may be decided that a pixel in an image is part of the hand if the difference between a color of the pixel and the second color exceeds a relatively high threshold difference.

More generally, if the captured images are determined by module 142 to be consistent with the movement of a human hand, then the images, or at least the pertinent image portions that include the hand movement, are sent to feature extraction module 144. That is, it is possible for the captured images to be truncated or clipped so as to be just big enough to include the hand movements.

Feature extraction module 144 may analyze the captured images to determine the exact form or definition of the movement 15 of the hand or index finger 14. For example, module 144 may use a grid similar to that shown in FIG. 3 in order to digitize and record the perceived line of movement of the user's hand.

Feature extraction module 144 may take into account the slow movements of the background surface 12 due to, for example, vehicle vibration. In specific embodiments, module 144 may receive in-car vibration data with which module 144 may estimate and account for the slow moving vibration of surface 12. This vibration data may be received from an in-vehicle vibration sensor 146 and/or from an in-vehicle idle speed controller/engine speed sensor 148 that controls or measures the revolutions per minute at which the vehicle's engine runs. The vibration data may include a speed and/or magnitude of cyclic movement associated with the vibration. Another algorithm may translate how this vehicle vibration relates to the speed and/or magnitude of vibration of surface 12.

In yet another embodiment, the system may compensate for other types of movements of the surface of the vehicle. For example, if surface 12 is on steering wheel 24, then feature extraction module 144 may compensate for the rotation of steering wheel 24 based on readings from a steering sensor 149. In addition to rotating the background surface, the rotation of steering wheel 24 may tend to drag the user's finger along with the rotation. As another example, a sudden lane change may cause the background surface of steering wheel 24 to swing back and forth, and may cause the user's finger to make a horizontal zigzag pattern on surface 12. Feature extraction module 144 may ignore such finger dragging when matching the finger movements to an alphanumeric character. Similar, more subtle effects may be caused by acceleration, deceleration and/or turning, and the background image as well as the overall interpretation of the finger writing may be compensated for all these effects. Conventional on-vehicle sensors, such as speedometers, gyroscopes, etc., may provide the vehicle movement data to feature extraction module 144.

Regardless of whether vibration or other background movements are measured or accounted for, the hand movement pattern determined by feature extraction module 144 may be sent to handwriting and gesture recognition module 118.

Gesture recognition module 118 may determine which of the twenty-six letters or ten numerals is best represented by the movement made by the user's finger or hand. Module 118 may recognize lower- or upper-case letters, and also may recognize printed letters, block letters, or script letters.

The output of handwriting and gesture recognition module 118 may be received by an optional gesture confirmation module 120. Gesture confirmation module 120 may seek and/or receive feedback from the user to confirm that the output of gesture recognition module 118 is correct.

Having been confirmed by module 120, the output of recognition module 118 may be transmitted to vehicle systems 30, 32 and/or 34, perhaps by communication module 122. Other features of system 100 are similar to those of system 10 of FIG. 1, and thus are not described herein in order to avoid needless repetition.

In the hand region detection module 142, it may be beneficial to exclude the frames that have transient motion in the beginning and the end of a gesture sequence. This exclusion can be performed automatically by excluding the frames in which the total area of the detected skin blobs or shapes is very small (e.g., lower than a predefined threshold value), and/or in which the total area of the detected skin blobs is lower than a threshold percentage of the total frame area. Such is often the case when the driver starts a gesture input resulting in his hand beginning to enter the field of view (FOV) of the capture device (e.g., a video camera). Such is often also the case when the driver completes the gesture input resulting in his hand beginning to leave the FOV.

Figure 5A:
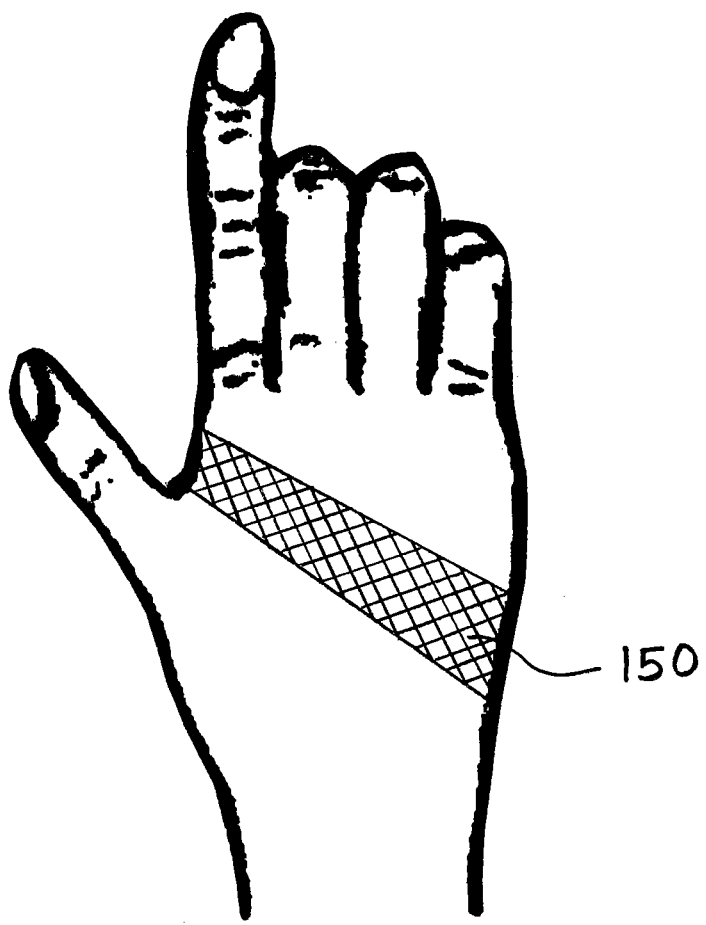
FIG. 5a is an illustration of an image of a user's hand captured by the gesture-capturing module of the gesture-based information and command entry system of FIG. 1, with a shadow extending across the image of the hand.
Figure 5B:
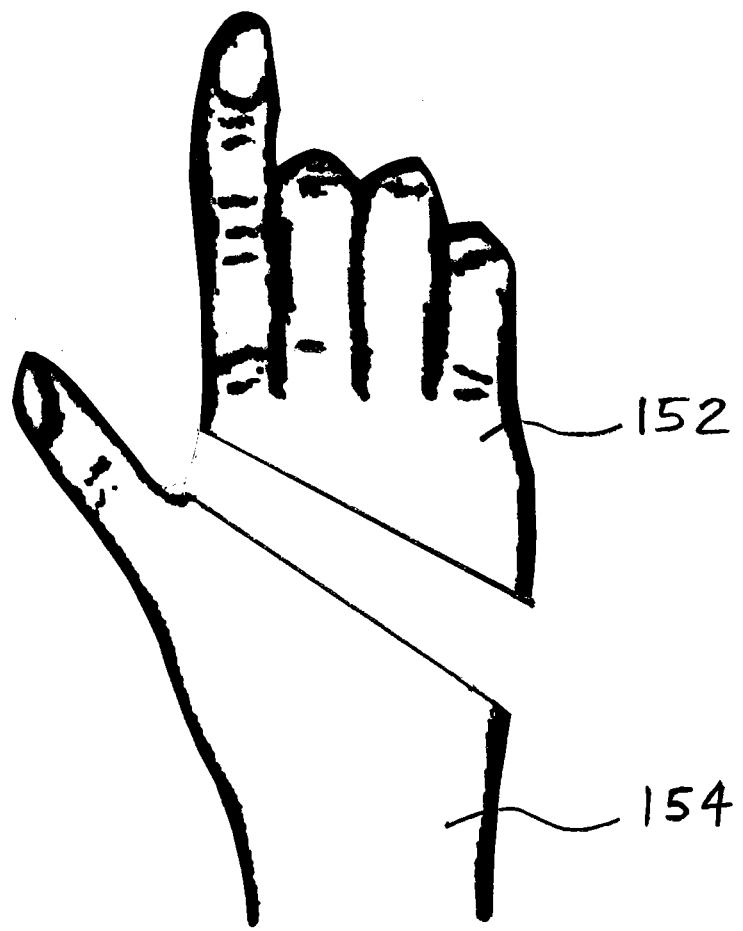
FIG. 5b is an illustration of the image of FIG. 5a as it may be perceived by the system of FIG. 1 due to interpreting the shadow as being part of the background.

During the process of the gesture input, the driver's hand region is usually represented by one big skin-colored shape or several disconnected skin-colored shapes in each video frame after the background image is subtracted from the images of the skin-colored shape. The single hand appearing to be multiple disconnected skin-colored shapes in the images may be caused by illumination effects (e.g., shade, shadow, ring effects, etc.) of in-car environments. FIG. 5a illustrates an example image of a user's hand that is partially obscured by a shadow 150 extending across the hand. Shadow 150 may be caused, for example, by a lamp post beside the road on which the vehicle is driving, or may be caused by a structural vertical beam of the vehicle body that might be disposed between the front and rear side windows. These effects can make some parts of the hand look similar to the background, which cannot be accounted for or handled by typical background subtraction algorithms. Thus, to the system, the hand of FIG. 5a may appear to be two unconnected skin-colored shapes 152, 154, as shown in FIG. 5b. Shapes 152, 154 may be separated by the band of shade 150 due the system interpreting the band of shade 150 as being a part of the background. To improve the robustness of the hand detection, the novel inventive algorithm may merge skin-colored shapes that are close to each other in the image if at least one of the shapes has an area larger than a predefined threshold area value. For example, as shown in FIG. 5c, parts 152, 154 may be merged together to form an image of a complete hand that closely matches the actual shape of the user's hand at that particular moment in time.

Figure 5C:
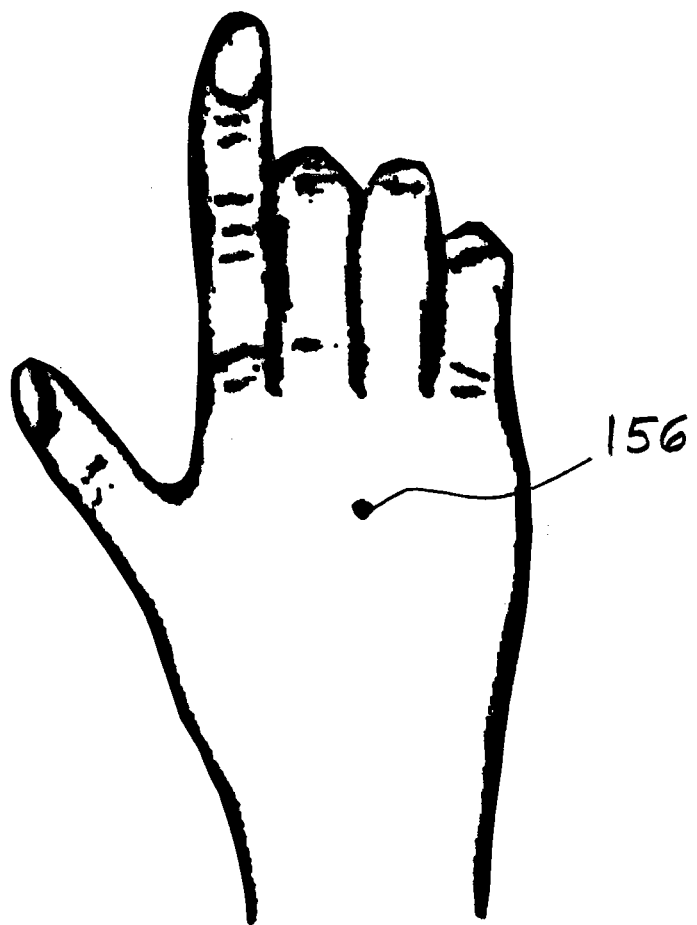
FIG. 5c is an illustration of the image of FIG. 5a as interpreted by the hand region detection module of FIG. 4 by merging the separate, unconnected shapes of FIG. 5b according to one embodiment of a method of the present invention.

Of course, although an actual image of the complete hand is shown in FIG. 5c for illustration purposes, the inventive method does not require such an explicit step to be taken. More generally, the merging may include considering an area in-between the separate and unconnected shapes to be, along with the shapes themselves, part of the user's hand.

In another embodiment, scale-invariant feature transformation (SIFT) type algorithms may be used to solve the problem of disconnected skin-colored shapes for hand region detection. Regardless of whether the shapes are merged or a SIFT algorithm is used, a post-processing step may be employed to fill in small holes inside the detected hand region after the merging operation. More particularly, morphological closing or a median filtering procedure may be used to fill in the small holes inside the detected hand region after the merging.

After the hand region is identified in each video frame in hand region detection module 142, feature extraction module 144 may be used to extract features to model the hand motion trajectory for gesture recognition by handwriting and gesture recognition module 118. In one embodiment, two types of features are extracted by feature extraction module 144. The first feature is the center of mass (COM) of the hand region. This parameter may be extracted because COM is very robust and insensitive to the misclassification of the skin pixels near the boundary of the detected hand region. The COM values may be computed by evaluating the zero order moment of all skin pixels inside the detected hand region.

Fingertip position may be chosen as the second feature to be extracted by feature extraction module 144 because it may be more precise to use fingertip position to represent the handwriting trajectories. A K-curvature algorithm may be used to detect the fingertip position in each video frame. This algorithm may assume that the finger is the sharpest point in the hand contour.

Other geometric detection rules may also be used. For example, the inventive system may pick the point farthest from the COM on the hand contour as the finger tip. Alternatively, the inventive system may fit a circle to the candidate hand region and then pick circles with small but reasonable diameters for the fingertip detection. For example, circles of a size corresponding to the actual size of a human fingertip may be picked. However, given the relatively slow hand motion between consecutive frames in this application, a certain level of continuity of the finger tip position may also be assumed. Thus, one embodiment of the inventive algorithm makes use of the fingertip position information from the previous video frame, and possibly from a plurality of previous video frames, to predict the position of the fingertip in the next frame. Once the COM and the fingertip position are computed for each frame, the COM and the fingertip position may be normalized and combined/concatenated to a feature vector. The sequence of these feature vectors may be used as the input to gesture recognition module 118. The combination of COM and fingertip position is a novel way of modeling the hand motion trajectory, and this combination provides a novel and effective method of gesture recognition.

In gesture recognition module 118, hidden Markov model (HMM) and/or template matching type classifiers can be utilized to model the gesture. The inputs to these classifiers can be vector sequences of the normalized COM and the fingertip position, or a linear or nonlinear combination of the normalized COM and the fingertip position. Based on the experience of the speech recognition, the corresponding velocities and accelerations of the normalized COM and fingertip positions may also be included in the input feature vector to improve the classification performance. Both classifiers can be used to recognize a handwriting gesture of a single alphanumeric character. However, a portion of a character writing or gesture can also be modeled instead of modeling a writing or gesture of the whole character. The structural information and rules of writing alphanumeric characters may also be included in this framework.

With this inventive recognition scheme, a hand gesture by the driver on or near a designated surface within a car's passenger compartment may be recognized. Then, confirmation module 122 may be used through another modality such as a speech dialog module to ensure that the intended meaning of the user is understood. The speech dialog module may ask the user for confirmation if the confidence value of the gesture recognition falls within a certain range. Alternatively, the speech dialog module may prompt the user to re-write the information if the confidence value of the recognition falls below a tuned (e.g., user-adjustable) or adapted threshold value. Thus, the inventive system may facilitate the operation of the desired devices without overly distracting the driver while he is driving, thereby increasing the level of driving safety.

The method of the invention may be especially suitable for an in-car environment. The invention improves upon traditional background subtraction algorithms by increasing performance levels in a number of ways. First, prior knowledge of the in-car background surface, such as the color of a steering wheel, may be incorporated into the background model. Second, the assumption of a slow motion, non-static nature of the background of in-car environment may be incorporated into the background model. For example, when distinguishing between the hand and the background in captured images, it may be assumed that the background may be changing between sequential images, but at a low rate of speed. Third, the robustness of the hand region detection algorithm may be improved via the novel technique of merging together multiple shapes that each resembles skin. This novel merging technique may compensate for bad illumination effects (e.g., shadows, shade, ring effects on the driver's hand) of the in-car environment.

The invention may integrate multiple sources of information regarding the hand locations and fingertip locations, which has not been done in the prior art. Additional factors indicative of current hand locations and fingertip locations, including previous hand locations and fingertip locations, hand and fingertip velocity, and hand and fingertip acceleration may be used in calculating the current hand locations and fingertip locations. Thus, the system performance is improved for the in-car environment and applications.

The invention may provide a handwriting and gesture recognition system that is especially suitable for in-car information data and command entry and control. In one embodiment, the inventive system includes a background surface, a video acquisition module, a hand region detection module, a feature extraction module, a gesture/sub-gesture recognition module, a speech dialog module, an optional gesture confirmation module, and a communication module.

Another possible feature of the invention is that it provides a set of features for online in-car hand gesture recognition that includes of the combination and/or concatenation of the center of mass (COM) of the hand and the fingertip position. For example, the movements of both the fingertip and the COM of the hand may be used when calculating or modeling the path or trajectory that has been taken by the user's hand.

Yet another possible feature of the invention is that it provides a classifier for online or real-time in-car handwriting and gesture recognition that uses the full or segmented hand trajectory patterns, trajectory speed, and/or trajectory acceleration as input(s) to thereby enable the recognition of the alphanumeric character represented by the hand gesture. More particularly, it is possible for the lower-half segment or portion of the capital letter "Q" to be recognized by the system, as the lower-half of the letter is more distinctive than the upper half of the letter. Moreover, the typical hand movement, or range of hand movements, that a user might make when handwriting a particular letter may be dependent upon the speed and/or acceleration of the hand when doing the handwriting. Thus, the invention may measure the speed and/or acceleration of both the fingertip and the COM of the hand of the course of the writing of the character. These measured speeds and accelerations may be used within the algorithm in order to decide which of the thirty-six alphanumeric characters that the user is most likely trying to write.

In another embodiment, the system may sense that the user is attempting to write in lower-case letters, which may be more difficult for the system to recognize. It is possible that the sensing that the user is attempting to write in lower-case letters is based at least partially on a positional relationship between the hand's COM and a fingertip. For example, it may have been empirically determined that the finger is more often extended in a direction approximately perpendicular to the palm when writing lower case letters that when writing upper case letters. That is, it may have been empirically determined that the finger is more often extended in a direction approximately parallel to the palm when writing upper case letters that when writing lower case letters. In response, the system may interpret future writings with an assumption that the user was using lower-case letters in those writings as well. Alternatively, or in addition, the system may audibly ask the driver to "Please write in capital (upper-case) letters", so that they system may interpret the writings with greater accuracy.

Figure 6:
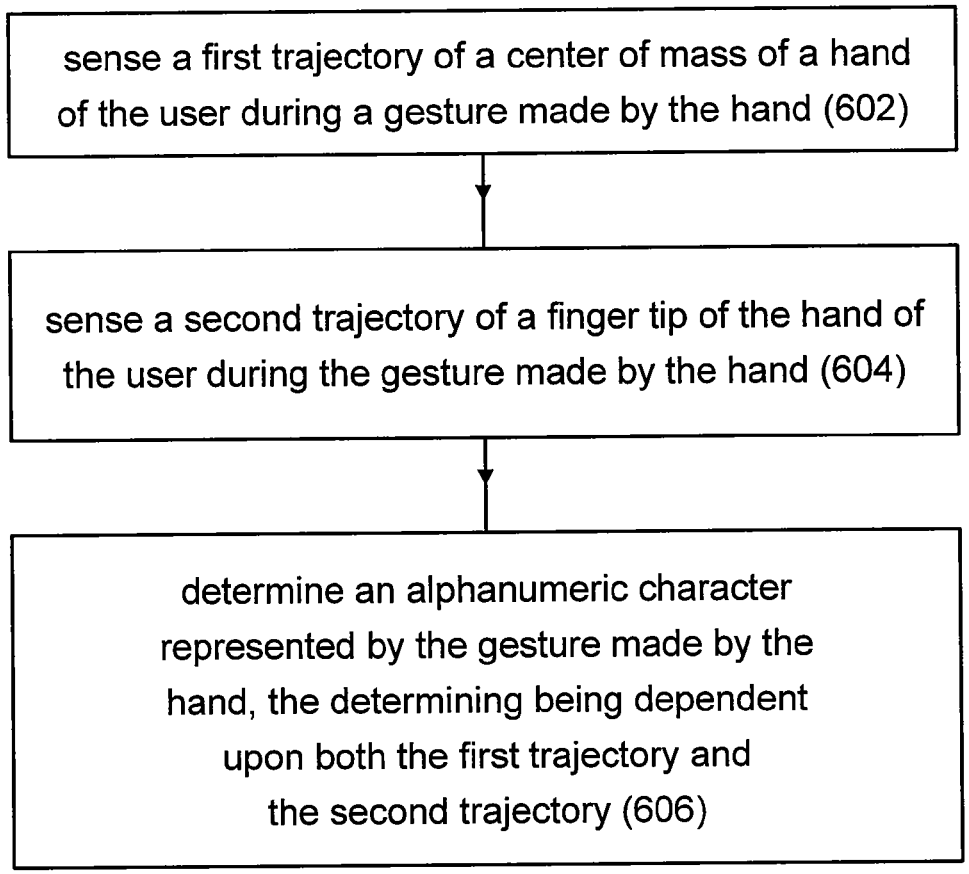
FIG. 6 is a flow chart of one embodiment of a method of the present invention for receiving input from a user.

In FIG. 6, there is shown one embodiment of a method 600 of the present invention for receiving input from a user. In a first step 602, a first trajectory of a center of mass of a hand of the user during a gesture made by the hand is sensed. For example, in the embodiment shown in FIG. 4, the path of movement of a COM 156 of the user's hand while the fingertip follows path 15 may be tracked by a camera 16 and recorded in memory.

In a next step 604, a second trajectory of a finger tip of the hand of the user during the gesture made by the hand is sensed. For example, continuing reference to the embodiment shown in FIG. 4, the path of movement 15 of the user's fingertip may be tracked by a camera 16 and recorded in memory.

In a final step 606, an alphanumeric character represented by the gesture made by the hand is determined dependent upon both the first trajectory and the second trajectory. For example, a lookup table or an algorithm may be employed to determine which numeral or letter is best represented by the group of locations defined by the combination of the movement of the COM of the user's hand and the movement of the user's finger.

Figure 7:
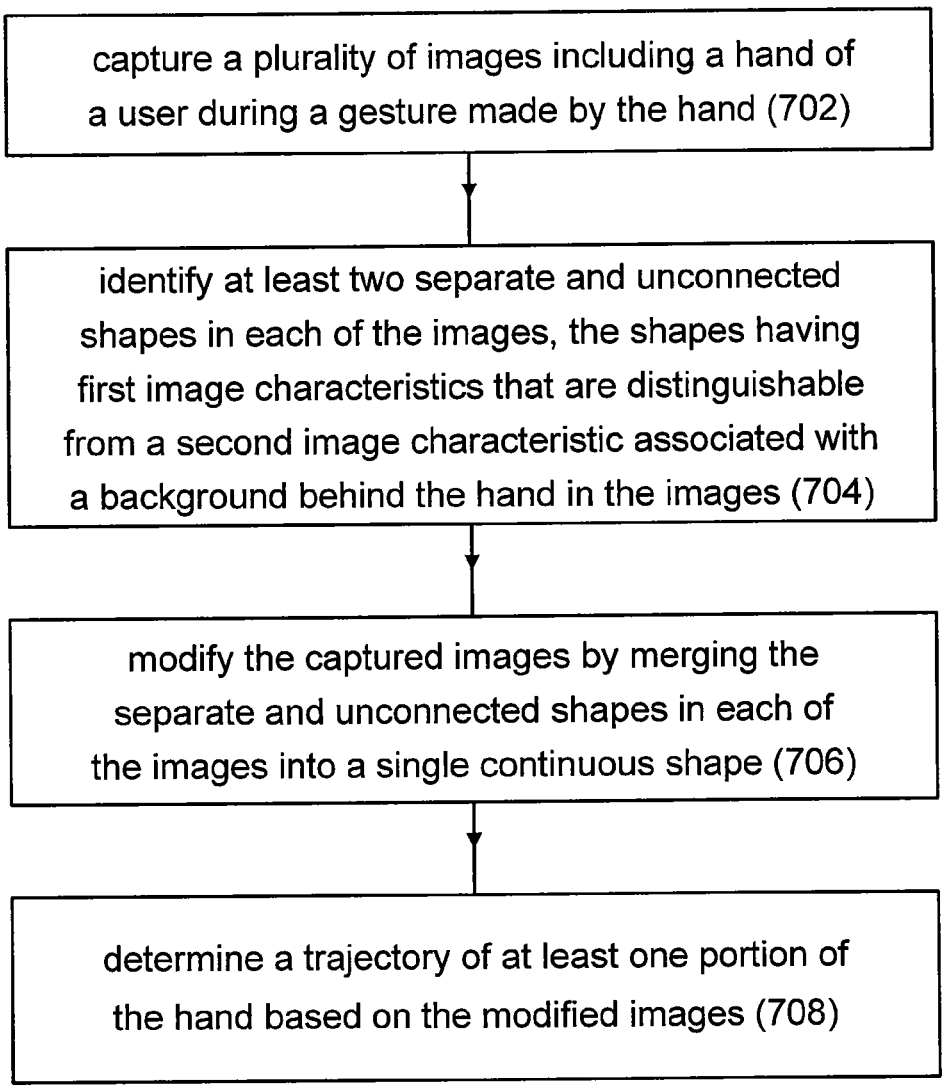
FIG. 7 is a flow chart of one embodiment of a method of the present invention for entering input into a vehicle system.

An embodiment of a method 700 of the present invention for entering input into a vehicle system is illustrated in FIG. 7. In a first step 702, a plurality of images are captured including a hand of a user during a gesture made by the hand. For example, camera 16 may capture a sequence of images of the user's hand while the hand makes the gesture following trajectory 15 (FIG. 4).

In a next step 704, at least two separate and unconnected shapes are identified in each of the images. The shapes have first image characteristics that are distinguishable from a second image characteristic associated with a background behind the hand in the images. For example, in the embodiment shown in FIGS. 5a-b, two different and separate shapes 152, 154 are detectable by the image processing algorithm associated with camera 16. Shapes 152, 154 may be distinguishable from the background in that shapes 152, 154 are of a different color than the background. Shapes 152, 154 may be unconnected to each other, although they are part of the same hand in actuality, because shadow 150 extends across the hand and causes the image processing algorithm to mistake shadow 150 for part of the background. For example, shadow 150 may appear closer in color to the background than to shapes 152, 154.

Next, in step 706, the captured images are modified by merging the separate and unconnected shapes in each of the images into a single continuous shape. For example, as shown in FIG. 5c, shapes 152, 154 may be merged together to form one continuous hand. That is, the portion of the hand covered by shadow 150 may be effectively replaced by a portion having the same color as shapes 152, 154.

It is to be understood that although a complete hand created from the merger of shapes 152, 154 is shown in FIG. 5c for illustration purposes, an actual image of a complete hand resulting from the merger is not necessarily created. Rather, merely a mathematical model of a complete hand may be created on which to base hand trajectory determinations, as in final step 708 discussed below. More generally, the merging process may include merely considering an area in-between the separate and unconnected shapes to be, along with the shapes themselves, part of the user's hand.

In a final step 708, a trajectory of at least one portion of the hand is determined based on the modified images. For example, based on the mathematical model of a complete hand, as shown in FIG. 5c, a center of mass 156 of the hand may be calculated. By similar calculations, the center of mass 156 may be identified in each of the other captured images. By tracking the movement of the center of mass 156 in each of the sequential images, a trajectory of the COM 156 may be determined. Moreover, by tracking the movement of any other chosen part of the hand, such as the tip of the index finger, in each of the sequential images, a trajectory of that particular hand part may be determined.

Figure 8:
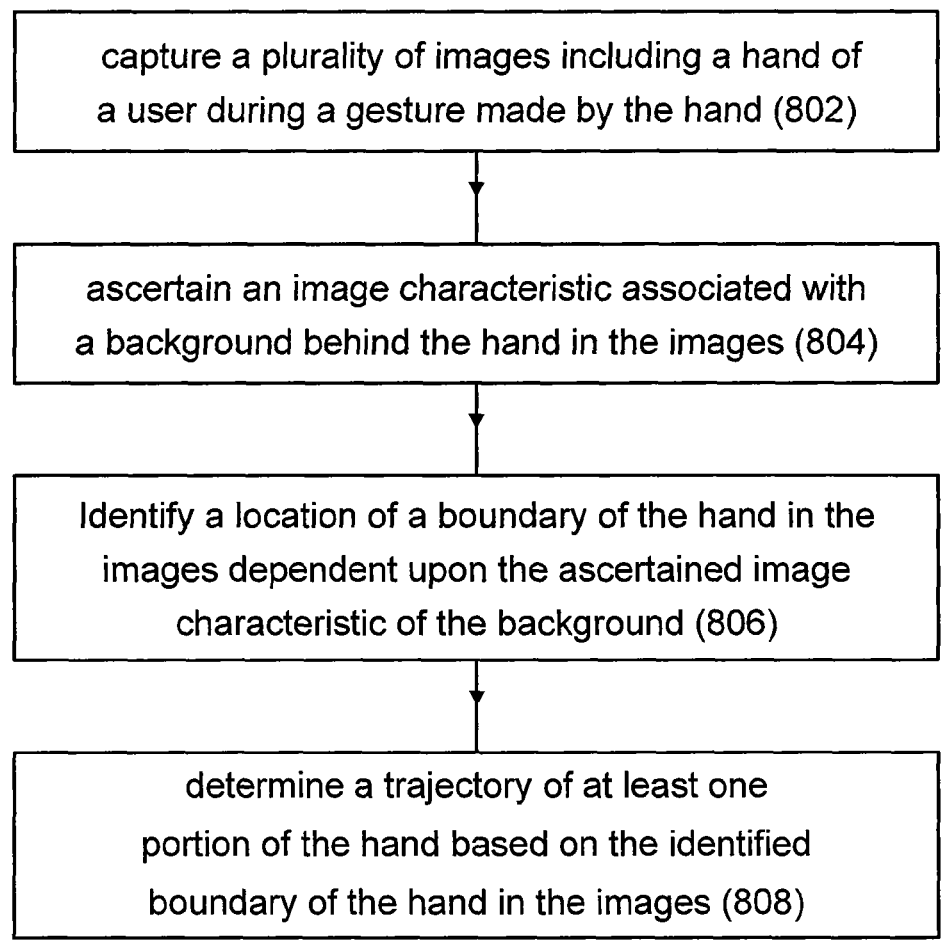
FIG. 8 is a flow chart of another embodiment of a method of the present invention for entering input into a vehicle system.

An embodiment of a method 800 of the present invention for entering input into a vehicle system is illustrated in FIG. 8. In a first step 802, a plurality of images are captured including a hand of a user during a gesture made by the hand. For example, camera 16 may capture a sequence of images of the user's hand while the hand makes the gesture following trajectory 15 (FIG. 4).

In a next step 804, an image characteristic associated with a background behind the hand in the images is ascertained. For example, a color of a background surface may be ascertained. In one embodiment, once an interior color is decided upon for the vehicle in the system is installed, that interior color may be manually programmed into the system. Another example of an image characteristic associated with the background may be the frequency and/or magnitude with which the background vibrates. In the embodiment of FIG. 4, vibration sensor 146 and/or engine speed sensor/controller 148 may provide such vibration data to feature extraction module 144.

Next, in step 806, a location of a boundary of the hand in the images is identified dependent upon the ascertained image characteristic of the background. For example, by knowing the color of the background surface 12, the system may more easily determine the locations of transition between the background color and the hand (i.e., the boundary of the hand). Alternatively, or in addition, the system may take into account the degree of in-vehicle vibration in deciding the exact actual location of the user's hand.

In a final step 808, a trajectory of at least one portion of the hand is determined based on the identified boundary of the hand in the images. For example, based on the identified location of the hand in each of the sequential images, by tracking the movement of any chosen part of the hand, such as the tip of the index finger, in each of the sequential images, a trajectory of that particular hand part may be determined.

Although the invention has been described herein as being applied to a vehicle, it is to be understood that the invention may have other applications. More generally, the invention may be applicable to any system in which an operator may need to quickly enter alphanumeric input without diverting his attention from another task. For example, the invention may be utilized in a factory environment and used by a human machine operator.

While this invention has been described as having an exemplary design, the present invention may be further modified within the spirit and scope of this disclosure. This application is therefore intended to cover any variations, uses, or adaptations of the invention using its general principles.

What is claimed is:

1. A method of receiving input from a user, said method comprising the steps of:
    capturing images of a gesture made by a hand of the user with a surface of the vehicle in a background of the images, the surface being located on a steering wheel or on an armrest of a motor vehicle, the surface having a color;
    identifying at least two separate and unconnected shapes in each of the captured images, the shapes having a first color, a background behind the hand in the visual images having a second color, the identifying including distinguishing the first color from the second color;
    modifying the captured images by merging the separate and unconnected shapes into a single continuous shape corresponding to the user's hand in each of the captured images;
    detecting a center of mass of the continuous shape of the hand in the captured images;
    detecting a finger tip of the continuous shape of the hand in the captured images;
    determining a first trajectory for the center of mass of the hand detected in the captured images;
    determining a second trajectory for the finger tip of the hand detected in the captured images; and
    determining an alphanumeric character represented by the gesture made by the hand, the determining being dependent upon both the first trajectory and the second trajectory.

2. The method of claim 1 wherein the surface has a vibration due to vibration of the motor vehicle, the sensing steps being dependent upon the vibration.

3. The method of claim 1 wherein the determining step comprises using a lookup table or algorithm relating the first and the second trajectories to the determined alphanumeric character.

4. The method of claim 1 comprising the further steps of:
    informing the user of the alphanumeric character and/or a word in which the alphanumeric character is included; and
    receiving feedback from the user regarding whether the alphanumeric character and/or word is an alphanumeric character and/or word that the user intended to be represented by the gesture made by the hand.

5. The method of claim 4 comprising the further step, in response to receiving feedback from the user that the alphanumeric character or word is correct, of transmitting an input to an electronic system, the input being dependent upon the alphanumeric character or word.

6. The method of claim 4 wherein the sensing and determining steps are repeated until a word formed by the alphanumeric characters is identified, the informing step comprising audibly or visually informing the user of the identified word.

* * * * *